United States Patent [19]

Ng

[11] Patent Number: 5,204,825
[45] Date of Patent: Apr. 20, 1993

[54] METHOD AND APPARATUS FOR EXACT LEADING ZERO PREDICTION FOR A FLOATING-POINT ADDER

[75] Inventor: Kenneth Ng, Saratoga, Calif.

[73] Assignee: Weitek Corporation, Sunnyvale, Calif.

[21] Appl. No.: 751,931

[22] Filed: Aug. 30, 1991

[51] Int. Cl.[5] .......................... G06F 7/38; G06F 7/50
[52] U.S. Cl. ............................. 364/715.04; 364/748
[58] Field of Search .................... 364/715.04, 748

[56] References Cited

U.S. PATENT DOCUMENTS

| | | | |
|---|---|---|---|
| 4,922,446 | 5/1990 | Zurawski et al. | 364/748 |
| 4,926,369 | 5/1990 | Hokenek et al. | 364/748 |
| 5,010,508 | 4/1991 | Sit et al. | 364/715.04 |
| 5,075,882 | 12/1991 | Sakai et al. | 364/748 |

OTHER PUBLICATIONS

Weitek 4167 Floating-Point Coprocessor Advanced Data Sheet, Weitek Corporation, Jul. 1989, pp. 1-28.
Hokenek and Montoye, "Leading-Zero Anticipator (LZA) in the IBM RISC System/6000 Floating-Point Execution Unit", *IBM J. Res. Devel.*, vol. 34, No. 1, Jan. 1990, pp. 71-77.
Steiss et al., "A 65MHz Floating-Point Coprocessor for a RISC Processor", 1991 *IEEE International Solid-State Circuits Conference*, Mar. 1991, Session 5, Paper TA 5.3. pp 94-95.

*Primary Examiner*—David H. Malzahn
*Attorney, Agent, or Firm*—Townsend and Townsend; Khourie and Crew

[57] ABSTRACT

A leading zero predictor (LZP) in parallel with the full subtraction operation correctly predicts the exact number of leading zeros of a subtraction result. Once the full subtraction operation is completed, the necessary shifts may be performed immediately, without a delay to determine the presence of leading zeros, and without need for a normalization corrector.

8 Claims, 6 Drawing Sheets

METHOD AND APPARATUS FOR EXACT LEADING ZERO PREDICTION FOR A FLOATING-POINT ADDER

BACKGROUND OF THE INVENTION

The present invention relates generally to floating point adders. In particular, the present invention relates to normalization in floating point adders. Most particularly, the present invention relates to leading zero prediction for normalization in floating point adders/subtractors.

In typical binary floating point operations, numbers are represented by an exponent and a mantissa. The mantissa is normalized so as to have a single nonzero digit to the left of the floating point; that is, the mantissa will be less than 2.0 and greater than or equal to 1.0. The most significant digit of the mantissa is sometimes called the hidden bit because according to some standards, such as the IEEE 754-1985 standard, this bit is not stored, because by definition of the format it is known to be a 1.

When two floating point operands are subtracted, the exponents are compared by subtraction, one of the operand mantissas is preshifted by the exponent difference and then the mantissas are subtracted (normally done by two's complement addition). If the numbers were originally close in value, the mantissa subtraction result may have a number of leading zeros. In order to normalize the result and put it into correct floating point representation, the mantissa must be left shifted to remove leading zeros and the exponent incremented accordingly. If leading zero detection is performed after the subtraction operation is complete, valuable time is wasted. Current floating point adders/subtractors typically perform some sort of prenormalization or leading zero anticipation in parallel with the subtraction process; a typical circuit is shown in FIG. 1. Operands A and B, reference numerals 1 and 2 respectively, are stored in register 10 and provided to subtractor 20, which computes the difference A-B. At the same time, the operands are provided to a leading zero anticipator (LZA) 30 that attempts to determine the number of leading zeros of the subtraction result, without actually doing the full subtraction, of course. The subtraction result 25 is then shifted in shifter 40 according to the result 35 from LZA 30. For some combinations of A and B, however, LZA 30 will incorrectly anticipate the number of leading zeros and the shifted result 45 will not be normalized, by a factor of one shift. For this reason, adjust-by-one normalization corrector 50 is required to determine whether shifted result 45 is correctly normalized, and shift it one bit if it is not, to produce normalized result 60. The need for normalization corrector 50 undesirably slows down subtraction operations.

SUMMARY OF THE INVENTION

The invention is directed to a leading zero predictor (LZP) that in parallel with the full subtraction operation correctly predicts the exact number of leading zeros of a subtraction result. Once the full subtraction operation is completed, the necessary shifts may be performed immediately, without a delay to determine the presence of leading zeros, and without need for a normalization corrector.

In the LZP the operands are divided into sets of bits, and subtraction comparisons are made between corresponding sets from the two operands. These comparisons are used to determine which corresponding set of the result will contain the leading 1, and this determination establishes a number of setwise shifts to be performed on the result. Once the correct set is identified, the corresponding setwise subtraction result from the earlier comparisons is examined, along with a determination of a need for a borrow from this setwise result, to determine the exact number of bitwise shifts necessary. The number of setwise and bitwise shifts are provided to a shifter along with the initial full subtraction result; the shifter then produces the final normalized result. This is done more quickly than if the prior art technique requiring a normalization corrector were used.

The present invention thus escapes the limitations of the prior art. A further understanding of the nature and advantage of this invention may be realized by reference to the remaining portions of the specification and drawings.

DESCRIPTION OF SPECIFIC EMBODIMENTS

Figure 1:
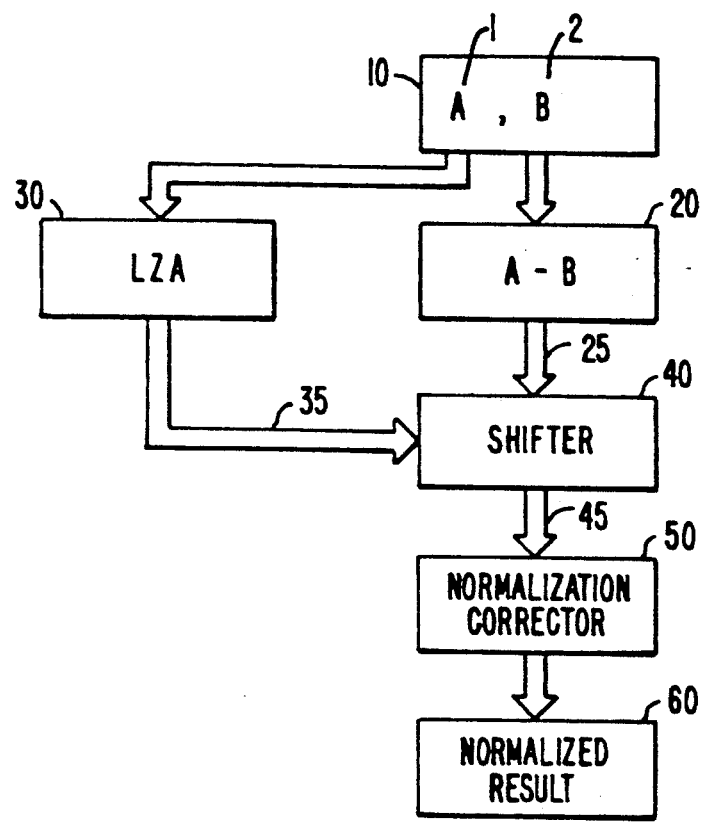
FIG. 1 is a block diagram of a prior art subtractor circuit requiring a normalization corrector.
Figure 2:
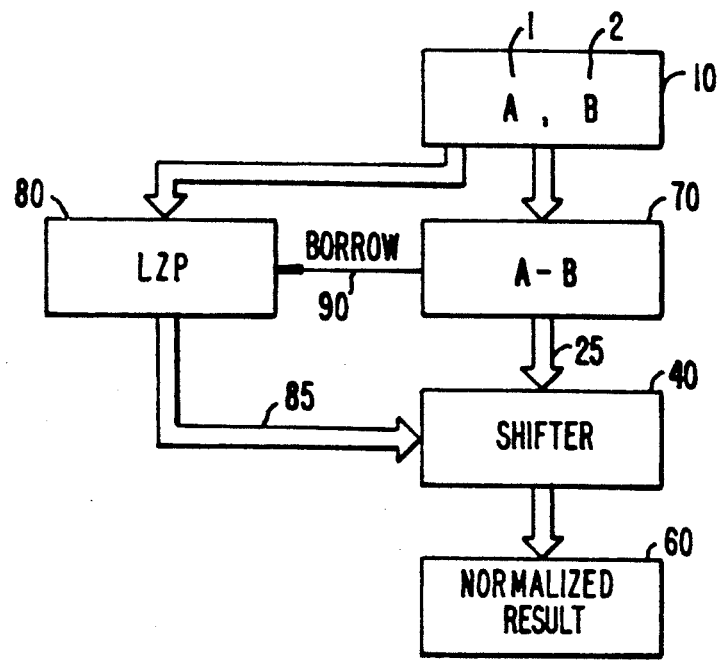
FIG. 2 is a block diagram of a subtractor circuit according to the present invention.

A subtraction circuit according to a particular embodiment of the present invention is shown in FIG. 2. Operands A and B, reference numerals 1 and 2 respectively, are stored in register 10 and are the shifted mantissas provided to subtractor 70, which computes the difference A-B. At the same time this computation is performed, the operands are provided to a leading zero predictor (LZP) 80 that determines the exact number of leading zeros of the subtraction result. The initial subtraction result 25 is then shifted in shifter 40, according to the result 85' from LZP 80, to directly produce the correctly normalized result 60 without the use of a normalization corrector. For reasons explained in detail below, the full subtractor 70 of this particular embodiment is designed so as to provide a borrow signal 90 to LZP 80 as quickly as possible, which is slightly before the full subtraction result is available.

Overview

Figure 3:
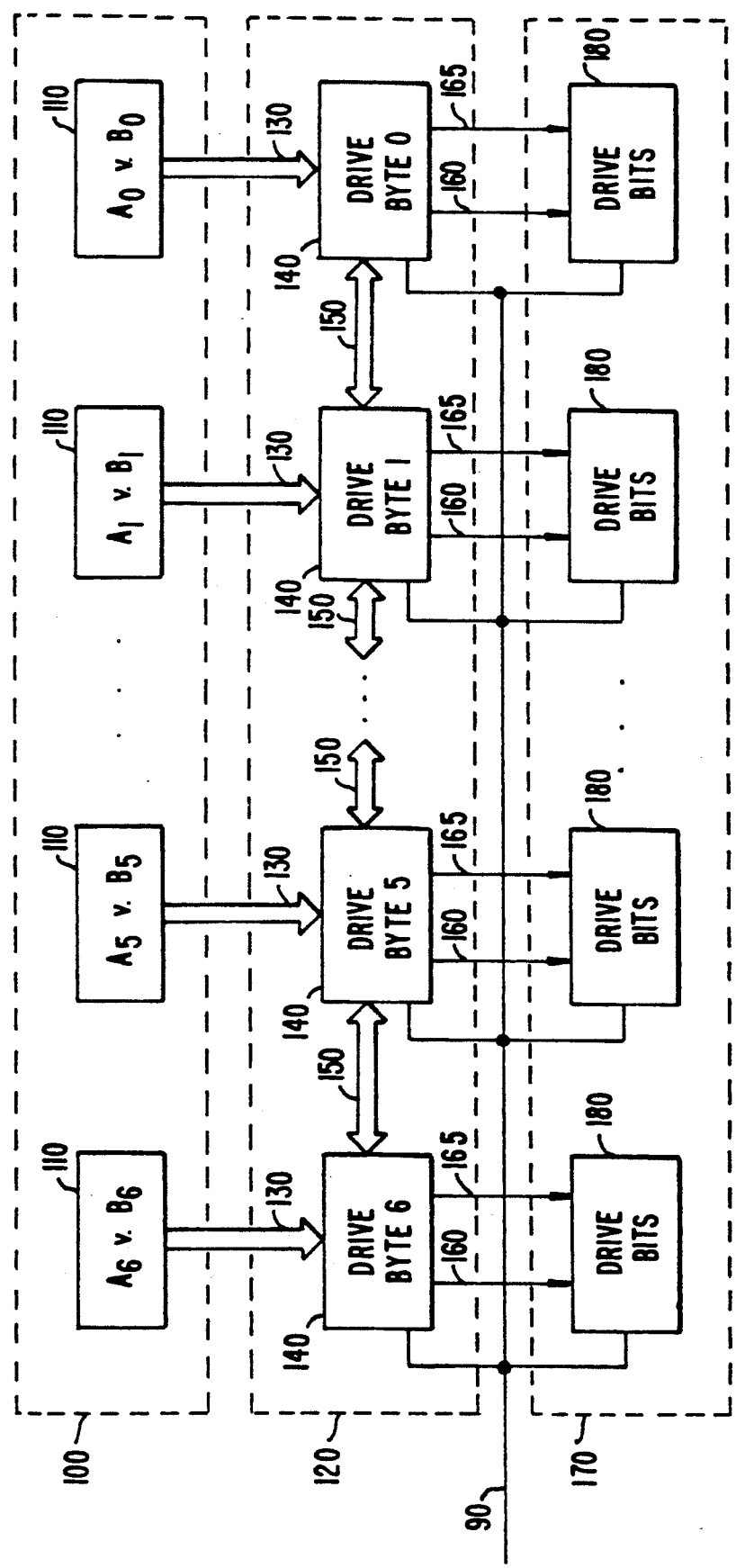
FIG. 3 is a block diagram illustrating the major stages of a leading zero predictor according to the present invention.

The major stages of LZP 80 are illustrate in FIG. 3. LZP 80 is designed for IEEE double precision floating point numbers, which have 53 mantissa bits. To increase parallelism, the 53 bits are padded with three zeros on the least significant side and then grouped into sets of eight bits. For references to particular bytes, subscripts will be used, with byte 6 being the most significant and byte 0 being the least significant. These bytes are then processed in three different stages. In a first stage 100, Each byte of operand A is associated with the corresponding byte from operand B, and comparisons are made between them in blocks 110. Because the logic of the LZP depends upon the proper ordering of the operands by magnitude, the logic of stage 100 is in duplicate form, so to account for both $A \geq B$ and $B > A$. In a second stage 120, results 130 from first stage 100 are used by blocks 140 to determine which byte of the overall result 25 will contain the most significant 1. Each of blocks 140 exchanges signals 150 with its neighbors and has two output lines. One output is a drive (or byte select) signal 160 that tells whether or not the corresponding byte contains the leading one of overall result 25, and the other is a borrow signal 165 that tells whether or not a borrow is needed from this byte. This stage is in duplicate form also, and the overall A-B borrow signal 90 is used at the end of this stage to determine which operand is larger and which logic path should therefore be used. A third stage 170 contains blocks 180 that use signals 150 and 160, along with a result byte selected from stage 100 by A-B borrow signal 90, to determine the exact bit position of the leading 1 of the result.

First Stage

Figure 4:
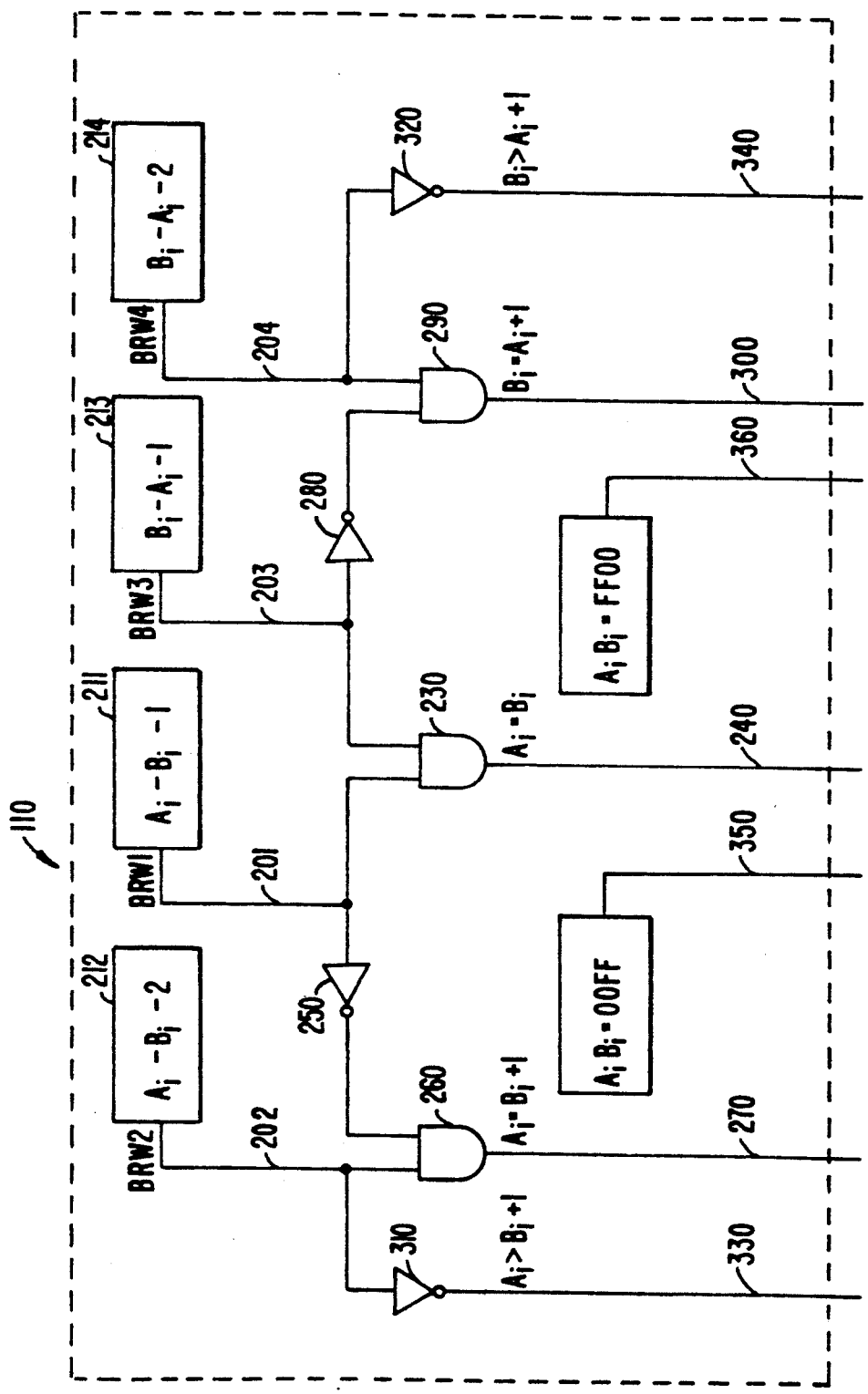
FIG. 4 is a diagram illustrating a block of the first stage of a leading zero predictor according to the present invention.

Stage 100 is made up of a number of identical blocks that receive a pair of bytes $A_i$ and $B_i$, one from each operand, and makes comparisons between them, as illustrated in FIG. 4. These comparisons determine whether $A_i = B_i$, $A_i = B_i + 1$, $A_i > B_i + 1$, $B_i = A_i + 1$, and $B_i > A_i + 1$. These determinations are derived from borrow signals BRW1 (201), BRW2 (202), BRW3 (203) and BRW3 (204) of subtractors 211, 212, 213 and 214, which compute $A_i - B_i - 1$, $A_i - B_i - 2$, $B_i - A_i - 1$ and $B_i - A_i - 2$, respectively. The subtractions are formed by complement addition, based on the equality $-X = X' + 1$ (where $X'$ is the one's complement of $X$). This can be rearranged so that $X' = -X - 1$. Thus, $A_i - B_i - 1$ is the sum of $A$ and $B_i'$, and the absence of a carry out indicates a borrow. $A_i - B_i - 2$ is the sum of $A_i$, $B_i'$ and $-1$ ($-1$ is FF for a single byte).

BRW1 and BRW3 are AND'ed together by AND gate 230 to produce $A_i = B_i$ signal 240. BRW1 is negated by inverter 250 and AND'ed with BRW2 by and gate 260 to produce $A_i = B_i + 1$ signal 270. Likewise, BRW3 is inverted by inverter 280 and AND'ed with BRW4 by AND gate 290 to produce $B_i = A_i + 1$ signal 300. Also, BRW2 and BRW4 are inverted by inverters 310 and 320 to produce $A_i > B_i + 1$ signal 330 and $B_i > A_i + 1$ signal 340, respectively. Two special case comparators check for $A_i B_i = 00FF$ hex ($A_i = 00$ and $B_i = FF$) and for $A_1 B_i = FF00$, producing signals 350 and 360, respectively. Signals 240, 270, 300, 330, 340, 350 and 360 are the comparison signals passed from stage 100 to stage 120.

Second Stage

Figure 5:
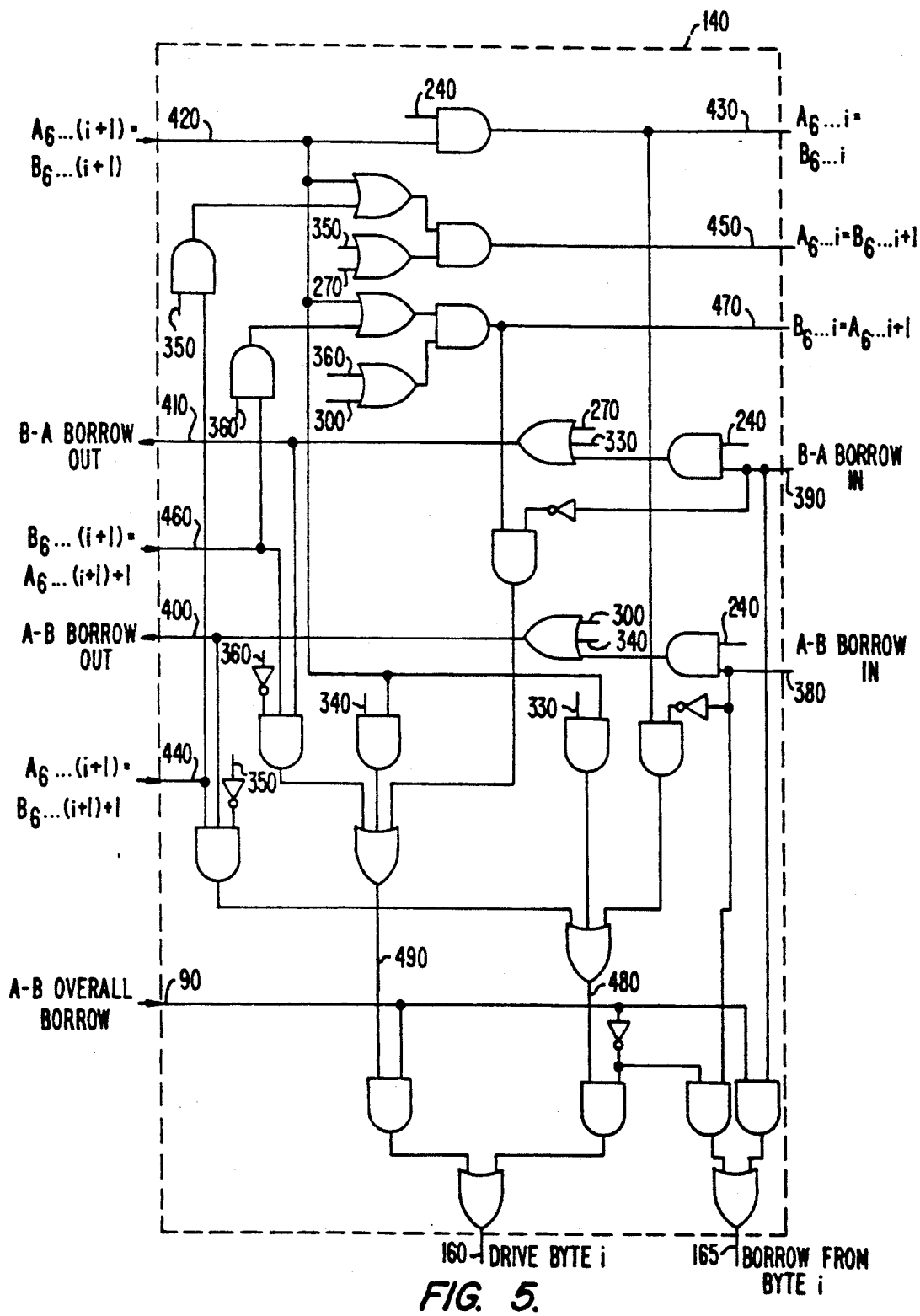
FIG. 5 is a diagram illustrating a block of the second stage of a leading, zero predictor according to the present invention.

Second stage 120 of LZP 80 is made of blocks 140, one for each byte pair i analyzed in stage 100, as illustrated in FIG. 5. These blocks 140 receive the above mentioned signals from stage 100, receive the overall A-B borrow signal 90 to identify the operand with larger magnitude, exchange information with their neighbors and send two output signals to stage 170. The output signals are drive-this-byte signal 160 and borrow-from-this-byte signal 165. In FIG. 5, the input signals from first stage 100 are simply indicated by their reference numbers.

The information exchange between neighboring blocks is as follows. Each block 140 receives from its less significant neighbor (byte $i-1$) an A-B Borrow In signal 380 and a B-A Borrow In signal 390, and in turn passes an A-B Borrow Out signal 400 and a B-A Borrow Out signal 410 to its more significant neighbor (byte $i+1$). For byte 0 (least significant) the Borrow In signals are set to zero, and for byte 6 (most significant) the Borrow Out signals need not be generated. Each block 140 also passes through three signals about the portions of the A and B operands made of the current byte up through the most significant. Thus, each block 140 receives from the next more significant block 140 an $A_{6...(i+1)} = B_{6...(i+1)}$ signal 420 and sends to the next less significant block 140 an $A_{6...i} = B_{6...i}$ signal 430. Likewise, an $A_{6...(i+1)} + 1$ signal 440 is received and an $A_{6...i} = B_{6...i} + 1$ signal 450 is sent, and a $B_{6...(i+1)} = A_{6...(i+1)} + 1$ signal 460 is received and a $B_{6...i} = A_{6...i} + 1$ signal 470 is sent.

A-B Borrow Out signal 400 is set true under any of three conditions. The first is that A-B Borrow In signal 380 is true and $A_i = B_i$ signal 240 is true. The second is that $B_i = A_i + 1$ signal 270 is true, and the third condition is that $B_i > A_i + 1$. Likewise, B-A Borrow Out signal 410 is set true under any of three similar conditions. The first is that B-A Borrow In signal 390 is true and $A_i = B_i$ signal 240 is true. The second is that $A_i = B_i + 1$ signal 300 is true, and the third condition is that $A_i > B_i + 1$.

$A_{6...i} = B_{6...i}$ signal 430 is set true only if $A_{6...(i+1)} = B_{6...(i+1)}$ signal 420 is true and $A_i = B_i$ signal 240 is true. The general rule for $A_{6...i} = B_{6...i} + 1$ signal 450 is that it is set true only if all the more significant bytes from both operands are equal (signal 420 true) and $A_i = B_i + 1$ signal 270 is true. There is one special case, however: when $A_i$ is 00 and $B_i$ is FF, and $A_{6...(i+1)} = B_{6...(i+1)} + 1$ signal 440 is true, the effective state is that $A_i = 100$ and $B_i = FF$, so $A_{6...i} = B_{6...i} + 1$ signal 450 is set true also in this situation. $B_{6...i} = A_{6...i} + 1$ signal 470 is generated in a manner symmetric to $A_{6...i} = B_{6...i} + 1$ signal 450: it is generally set true only if all the more significant bytes from both operands are equal (signal 420 true) and $B_i = A_i + 1$ signal 300 is true. It has a similar special case: when $A_i$ is FF and $B_i$ is 00, and $B_{6...(i+1)} = A_{6...(i+1)} + 1$ signal 460 is true, $B_{6...i} = A_{6...i} + 1$ signal 470 is set true also in this situation.

Now the generation of the output signals to third stage 170 will be described. From the above described signals, two drive signals are derived. These are an A-Drive signal 480 and a B-drive signal 490. A-Drive signal 480 is set true under any of three conditions: if $A_{6...(i+1)} = B_{6...(i+1)}$ signal 420 is true and $A_i > B_i + 1$ signal 330 is true; if $A_{6...i} = B_{6...i} + 1$ signal 450 is true and A-B Borrow In signal 380 is false; and lastly, if $A_{6...(i+1)} = B_{6...(i+1)} + 1$ signal 440 and A-B Borrow Out signal 400 are true and $A_1 B_i = 00FF$ signal 350 is false. B-Drive signal 490 is set true under three corresponding conditions: if $A_{6...(i+1)} = B_{6...(i+1)}$ signal 420 is true and $B_i > A_i + 1$ signal 340 is true; if $B_{6...i} = A_{6...i} + 1$ signal 470 is true and B-A Borrow In signal 390 is false; and lastly, if $B_{6...(i+1)} = A_{6...(i+1)} + 1$ signal 460 and B-A Borrow Out signal 410 are true and $A_i B_i = FF00$ signal 360 is false. Only one of A-Drive signal 480 and B-Drive signal 490 is selected to be Drive Byte i signal 160, according to the state of overall A-B borrow signal 90. Likewise, overall A-B borrow signal 90 selects one of A-B Borrow In signal 380 and B-A Borrow In signal 390 to be Borrow from Byte i signal 165.

Third Stage

Figure 6:
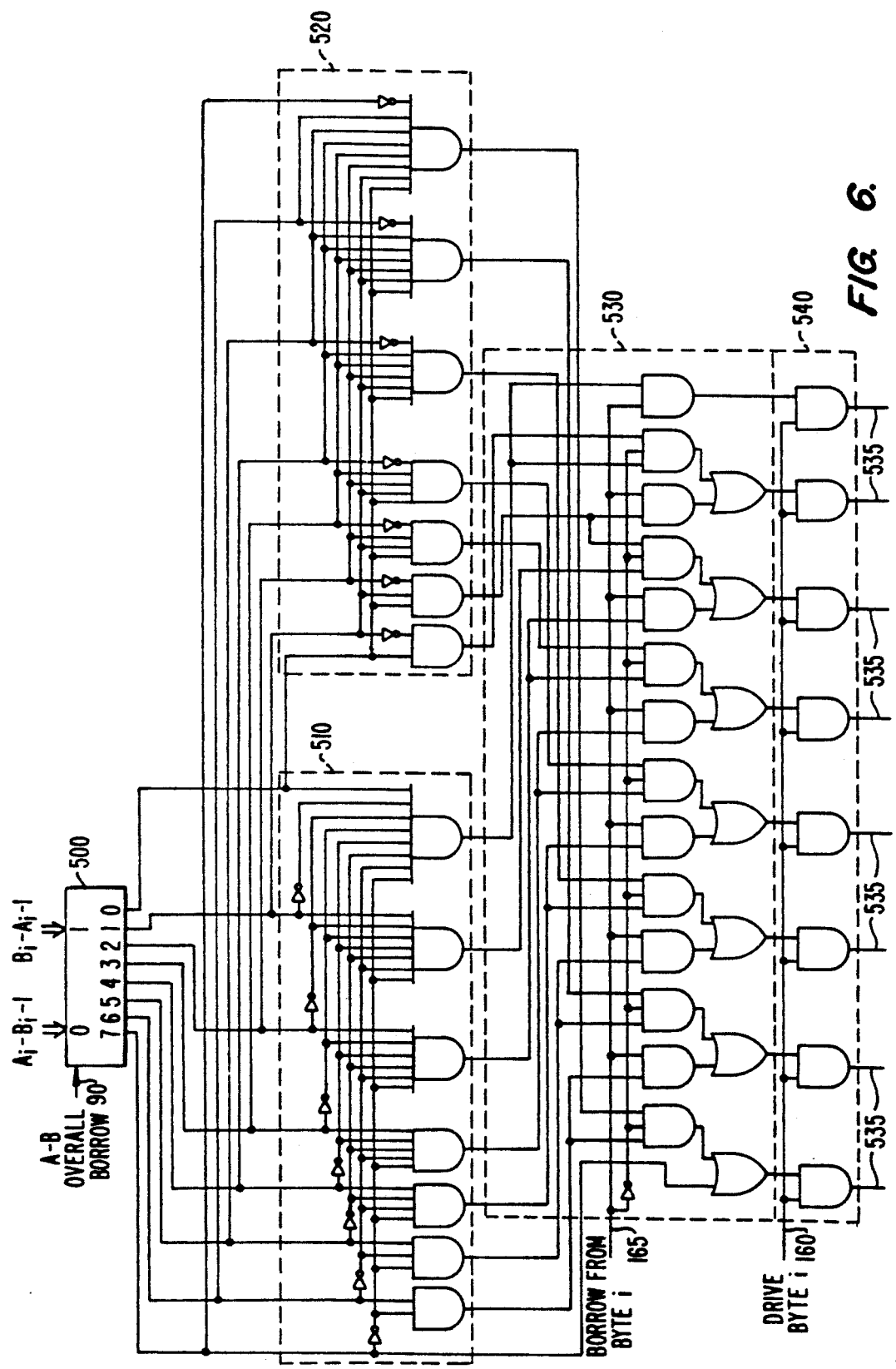
FIG. 6 is a diagram illustrating a block of the third stage of a leading, zero predictor according to the present invention.

A generic block 180 of third stage 170 is illustrated by FIG. 6. There is one such block for each operand byte pair i. Each block accepts signals 160 and 165 from a corresponding block 140, as well as A-B overall Borrow signal 90 and two eight bit results from the operand byte subtraction comparisons performed in first stage 100. Only one of the results is selected, by MUX 500 controlled by signal 90. $A_i-B_i-1$ is selected if signal 90 is false (no borrow, or $A \geq B$), and $B_i-A_i-1$ is selected if signal 90 is true ($A<B$). The individual bits of the selected bytewise result is then analyzed in two subcircuits. The first, subcircuit 510, determines the most significant 1 of the bits. The second, subcircuit 520, determines the least significant 0 of the bits. Then, in subcircuit 530, these signals are combined to produce bit shift select signals 535. A particular bit is selected as the leading 1 of the overall result if it is the most significant 1 of the bytewise result and there is a borrow from this byte (so the actual result byte is equal to the bytewise result), or if it is the least significant zero and the bit next less significant is the most significant 1 and there is no borrow from the byte. Subcircuit 540 simply gates bit shift select signals 535 according to whether this byte was selected to drive the shifter. Together with drive select signals 160, bit shift signals 535 make up shift control signals 85.

Shifter

Figure 7:
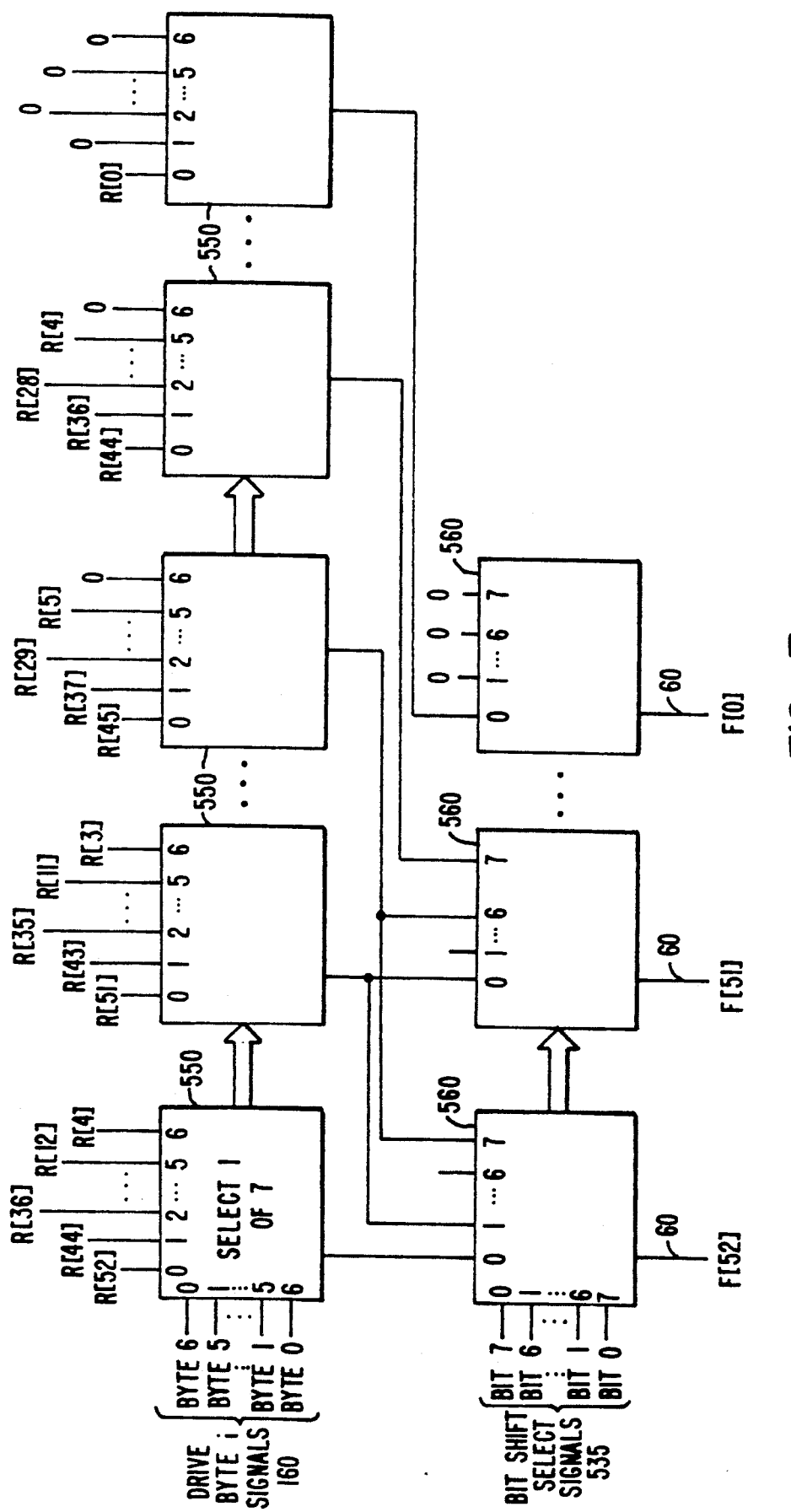
FIG. 7 is a diagram illustrating a shifter controlled by the output of a leading zero predictor according to the present invention.

The shifting mechanism is straightforward and is illustrated in FIG. 7. Initial subtraction result 25 has 53 bits R[52]to R[0]and three padding zeros, from most significant to least. Result 25 is first passed through a byte shifting layer. Result 25 has seven bytes (with zero padding) and the byte shifting layer consists of select-one-of-seven selectors 550 whose bit inputs are the result bits staggered by eight and whose controllers are the Drive Byte i signals 160 for the seven bytes. Any bits less significant than R[0]are zeros. The outputs from the selectors 550 go to a bit shifting layer made of select-one-of-eight selectors 560. The controllers for selectors 560 are the bit shift select signals 535, where the bit 0 lines from the different blocks 180 are all OR'ed together, the same for the bit 1 lines, etc., to provide the bit shift controllers for selectors 560. The output from selectors 560 make up bits F[52] to F[0] of normalized floating point result 60.

The above description is intended to be illustrative only and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A normalization apparatus for determining a number of leading zeros of a result of an operation subtracting from a first operand a second operand, said apparatus comprising:
    a) means for grouping the bits of each operand in sets, each set of bits from the first operand being paired with a corresponding set of bits from the second operand;
    b) means, coupled to the set pairs, for performing setwise subtractions with the set pairs to produce a plurality of setwise subtraction results;
    c) means, coupled to the setwise subtraction performing means, for selecting one of said setwise results, for determining a need for a borrow from said selected setwise result, and for determining a number of setwise normalization shifts according to a position of said selected setwise result;
    d) means, coupled to the setwise shift determining means, for determining a number of bitwise normalization shifts from said selected setwise result and said need for a borrow from said selected setwise result.

2. The apparatus of claim 1, wherein said setwise shift determining means is supplied, for each operand set pair, a signal identifying one of said two operands as an $\alpha$ operand greater than or equal to the other of said operands, said other operand being a $\beta$ operand, and wherein the setwise shift determining means comprises for each operand set pair:
    i) means for determining whether the $\alpha$ operand set is less than the $\beta$ operand set;
    ii) means for determining whether the $\alpha$ operand set is equal to the $\beta$ operand set;
    iii) means for determining whether the $\alpha$ operand set is exactly one greater than the $\beta$ operand set;
    iv) means for determining whether the $\alpha$ operand set is more than one greater than the $\beta$ operand set; and
    v) means for determining whether both the $\alpha$ operand set has a value MIN in which all bits are zeros, and the $\beta$ has a value MAX in which all bits are ones.

3. The apparatus of claim 1, wherein each set has eight bits.

4. The apparatus of claim 1, wherein the operands have 53 bits and are padded with three least significant zeros.

5. The apparatus of claim 1, wherein the setwise performing means for each set pair comprises:
    i) a subtractor for subtracting the second operand set plus 1 from the first operand set to produce a borrow signal b1:
    ii) a subtractor for subtracting the second operand set plus 2 from the first operand set to produce a borrow signal b2;
    iii) a subtractor for subtracting the first operand set plus 1 from the second operand set to produce a borrow signal b3; and
    iv) a subtractor for subtracting the first operand set plus 2 from the second operand set to produce a borrow signal b4.

6. The apparatus of claim 1, wherein said setwise shift determining means is supplied a signal identifying one of said two operands as an $\alpha$ operand greater than or equal to the other of said operands said other operand being a $\beta$ operand, and wherein said setwise shift determining means comprises:
    i) means for determining for each operand set pair a borrow condition indicating whether a borrow is needed from a next more significant set pair; and
    ii) means for determining a setwise shift drive condition for each set pair, said drive condition selecting a setwise result and being true only at the most significant potentially selected set pair for which
        1) a first value being the value of the group of $\alpha$ operand sets from the $\alpha$ operand set of the potentially selected set pair through the most significant α operand set, is more than one greater than a second value being the value of the group of β operand sets from the β operand set of the potentially selected set pair through the most significant β operand set, or 2) the first value is exactly one greater than the second value and the borrow condition for a next less significant set pair is false.

7. The apparatus of claim 6, wherein the bitwise shift determining means comprises:

vi) means for determining a position of a most significant 1 of said selected setwise result;

vii) means for determining a position of a least significant zero of said selected setwise result; and viii) means for determining the number of bitwise shifts, said number of bitwise shifts corresponding to the least significant zero position if both said least significant zero is more significant than said most significant 1 and a borrow is not needed from said selected setwise result, said number of bitwise shifts corresponding to the most significant 1 position otherwise.

8. The apparatus of claim 6, wherein said borrow condition determining means determine said borrow condition such that said borrow condition propagates from least significant to most significant, beginning as false, becoming true at a set pair for which the α operand set is less than the β operand set and becoming false at a set pair for which the α operand set is greater than the β operand set.

* * * * *